Sept. 16, 1952   F. E. PAYNE   2,610,874
DRIVING MEANS FOR FLUID SEALS
Filed Aug. 12, 1946

INVENTOR.
Frank E. Payne
BY Charles F. Vojtech
Atty.

Patented Sept. 16, 1952

2,610,874

UNITED STATES PATENT OFFICE 2,610,874

DRIVING MEANS FOR FLUID SEALS

Frank E. Payne, Glencoe, Ill., assignor to Crane Packing Company, Chicago, Ill., a corporation of Illinois Application August 12, 1946, Serial No. 689,855

3 Claims. (Cl. 286—11)

This invention relates to rotary seals of the mechanical type wherein a fluid-tight seal is effected between contacting radially disposed surfaces on relatively rotatable elements.

The principal object of this invention is to provide a rotary seal wherein a rigid washer is used as one of the sealing elements and which utilizes a very simply formed flexible deformable sealing element for effecting a seal between the washer and the element to which it is secured.

A specific object of this invention is to provide a rotary seal of the type described wherein a rigid washer is used as one of the sealing elements, with flexible deformable means for sealing the washer with respect to the element to which it is secured, and with means for preventing relative rotation between the washer and the said element.

A still more specific object of this invention is to provide a rotary seal utilizing a rigid washer as one of the sealing elements, a tubular sealing means connecting the washer to a shaft or the like, the tubular sealing means having one end pressed upon the shaft and the other end in the form of a flange, the outer periphery of which is pressed against the washer, and a band clamped to a portion of the sealing element by a press-fit so as to be non-rotatable with respect thereto and having an axially slidable rotary driving connection with the washer.

Figure 1:
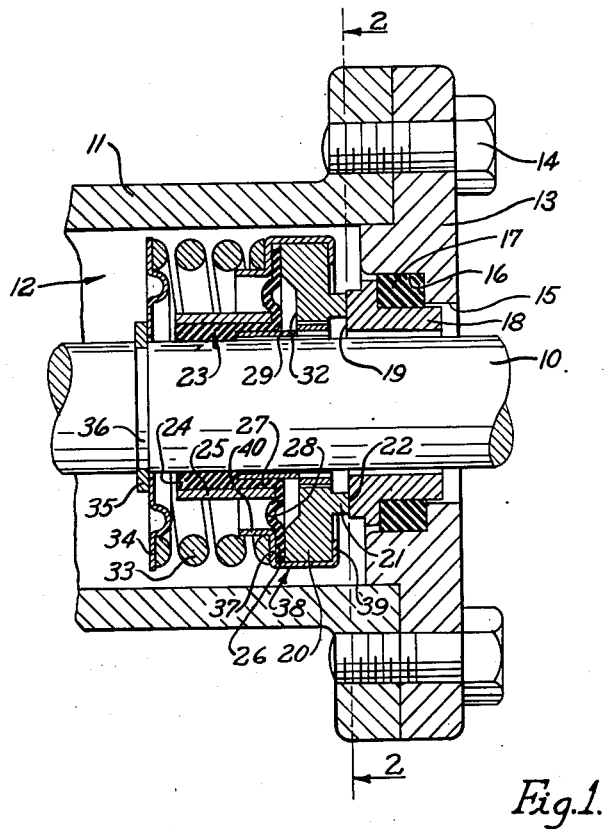
Figure 2:
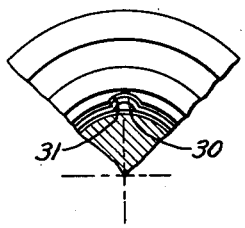

These and other objects and features of this invention will become apparent from the following detailed description when taken together with the accompanying drawings, in which Fig. 1 is a section taken through a seal embodying this invention, the seal being shown installed upon a shaft cooperating with a portion of a machine housing; and Fig. 2 is a fragmentary elevation taken along line 2—2 of Fig. 1 showing the means for driving the washer so as to relieve the sealing element of torque.

Referring specifically now to Fig. 1 for a detailed description of the invention, there is shown a shaft 10 passing through a stuffing box 11 or similar portion of a machine, the shaft diameter being considerably less than the opening in the stuffing box so as to leave a space 12 therebetween. Said space 12 is partly closed off at the right-hand end (Fig. 1) by a closure-plate 13 which is secured to stuffing box 11 by bolts 14 or other suitable fastening means. The closure-plate 13 has an opening 15 therein through which the shaft 10 passes, said opening 15 having a stepped or enlarged region 16 into which a resilient ring 17 of rubber, natural or synthetic or a combination of the two, is pressed. Said rubber ring 17 constitutes the sole support for a removable seat 18 made of wear-resistant material and having a radially disposed surface 19 thereon facing into space 12.

Adjacent seat 18 is a washer 20 of wear-resistant material having an axially projecting nose 21, the radially disposed surface 22 of which contacts surface 19 on seat 18. The quality of the surfaces 19 and 22 is such that with a moderate amount of pressure on washer 20 no fluid will be able to pass between them to the exterior of the stuffing box.

Washer 20 is sealed with respect to shaft 10 by a tubular sealing element 23 which is made of rubber, either natural or synthetic or a combination of the two, or of some similar flexible deformable material. Said sealing element 23 is formed at its left-hand end with a relatively thick cylindrical section 24 which is pressed upon the shaft 10 by a cylindrical band 25 of rigid material such as steel, brass or the like, and at its opposite end is formed with a flange 26 which abuts on the rear surface of washer 20. Intermediate cylindrical section 24 and flange 26 is a relatively thin section substantially L-shaped with the cylindrical leg 27 of the L joined directly to cylindrical section 24, said cylindrical leg constituting in effect a counterbore in the cylindrical section and the radially disposed leg 28 constituting a thin diaphragm or membrane which is flexible so as to permit washer 20 to move axially relative to cylindrical section 24 without destroying the seal between the washer and flanged end 26.

For purposes of illustration, cylindrical leg 27 is shown having the same outside diameter as the outside diameter of cylindrical section 24 although this relationship is not absolutely necessary for the proper functioning of the seal. The cylindrical leg 27 is compressed against the band 25 by a sleeve 29 of rigid material such as brass, steel or the like which is telescoped within band 25 for this purpose. Said sleeve 29 fits loosely upon shaft 10 so as not to interfere with the compression of cylindrical section 24 of sealing element 23 upon the shaft. The right-hand end of sleeve 29 is provided with one or more radially extending lugs 30 (Fig. 2) which extend into axially disposed slots 31 formed on the interior of washer 20. The lugs 30 thus prevent relative rotation between sleeve 29 and washer 20 and since sleeve 29 is frictionally retained in cylindrical leg 27, which in turn is held by band 25, lugs 30 likewise prevent relative rotation between washer 20 and cylindrical section 24 of sealing element 23.

In order that band 25 will not interfere with the axial movement of washer 20 on sleeve 29, washer 20 may be relieved as at 32 to provide a space between the washer and the radially extending leg 28 of the sealing element 23. Alternatively, the back face of washer 20 may be unrelieved and flat and the sealing element 23 altered in cross-section so that the flange 26 is displaced axially to the right (Fig. 1) from the radially extending leg 28 to provide a similar space between the washer and the radially extending leg 28.

Washer 20 is held against seat 18 by a spring 33 which abuts on a spring-holder 34, which in turn is restrained axially by a snap ring 35 fitting in a groove 36 in shaft 10. The opposite end of spring 33 abuts on a radial shoulder 37 of a ferrule 38 surrounding washer 20 and having its right-hand end (Fig. 1) 39 spun over the right-hand corner of the washer so as to clamp the flange 26 on sealing element 23 to the washer at all times. Although the clamping action assists in maintaining a seal between the washer and flange 26, it is primarily utilized to hold the washer 20 assembled with respect to sleeve 29 and sealing element 23. An axially extending flange 40 on ferrule 38 serves to center spring 33 with respect to ferrule 38 on washer 20.

In assembling the seal of this invention the sealing element 23 is first assembled with respect to band 25 and sleeve 29, the assembling of these two rigid elements being simultaneous if desired. Due to the fact that a press-fit is secured between sleeve 29 and axially extending leg 27, the sealing element 23, band 25 and sleeve 29 will be held frictionally together. Next, washer 20 is slipped over sleeve 29 with notches 31 properly aligned with respect to lugs 30, and ferrule 20 is then slipped over the flange 26 of sealing element 23 and the outside of washer 20. Following this, the end 39 of ferrule 38 is spun over by any suitable spinning machine and the washer and ferrule 38 become permanently attached to sealing element 23. The only elements which now remain loose are spring 33 and spring-holder 34.

To install the seal upon a shaft, snap ring 35 is placed in groove 36 and spring-holder 34 is then slipped over the shaft until it strikes snap ring 35. Next, spring 33 is assembled with respect to flange 40 on ferrule 38 and the entire assembly including the spring 33, ferrule 38, washer 20, sealing element 23, sleeve 29 and band 25 are slipped over shaft 10 until they occupy substantially the position shown in Fig. 1. The last step is to fasten closure-plate 13 to stuffing box 11.

It is apparent that the seal just described may be handled almost completely as a single unit and that no torque is transmitted from washer 20 to shaft 10, or vice versa, through the flexible radially disposed diaphragm 28 of sealing element 23 so that said diaphragm may be made sufficiently thin to provide the desired amount of flexibility without any danger of the diaphragm rupturing because of large torque loads which might be imposed upon it. The sleeve 29 may be made of tubing and hence is relatively inexpensive. Band 25 likewise may be made from tubing and is also inexpensive.

It is understood that the foregoing description is illustrative of preferred embodiments of this invention and that the scope of the invention is not to be limited thereto, but is to be determined by the appended claims.

What is claimed is:

1. In a fluid seal for relatively rotatable elements, a compressible sealing member comprising a cylindrical section at one end adapted to contact one of the elements, said cylindrical section having a counterbore, a wear-resistant radially disposed section at the other end for contacting the other element with a fluid-tight running fit, a diaphragm connecting the sections of the sealing member, a band encircling the cylindrical section and adapted to compress the cylindrical section against the said one element, a sleeve in the counterbore and adapted to compress the counterbored portion against the clamping band, said sleeve telescoping into the radially disposed section, and lugs on the sleeve, said radially disposed section having axially disposed notches into which the lugs extend to prevent relative rotation between the end sections of the sealing member.

2. In a fluid seal for relatively rotatable elements of the type having a compressible hollow cylindrical section at one end for press-fit upon one of the elements; a band encircling the cylindrical section and adapted to compress the cylindrical section against the said one of the elements, a wear-resistant radially disposed section at the other end for contacting the other element with a fluid-tight running fit, a compressible section connecting the end sections, said connecting section including an extension of the cylindrical section having substantially the same outer diameter as the cylindrical section and over which the band extends and a greater inner diameter than the cylindrical section, a sleeve telescoped at one end thereof into said connecting section having a greater inner diameter and clamping the compressible connecting section against the extending end of the band, and lugs on the other end of the sleeve, said radially disposed section having axially disposed slots into which the lugs extend, whereby to prevent relative rotation between the end sections of the seal.

3. In a fluid seal for relatively rotatable elements of the type having a compressible cylindrical section at one end for press-fit upon one of the elements, a wear-resistant radially disposed section at the other end for contacting the other element with a fluid-tight running fit, a compressible section connecting the end sections, the compressible connecting section having substantially the same outer diameter as the cylindrical section and a greater inner diameter than the cylindrical section; and a band for clamping the cylindrical section upon the said one of the elements; said band extending at one end over the compressible connecting section, a sleeve loose on the said one rotatable element telescoped at one end with respect to the band and clamping the compressible connecting section against the extending end of the band, and lugs on the other end of the sleeve, said radially disposed section having axially disposed slots into which the lugs extend, whereby to prevent relative rotation between the end sections of the seal.

FRANK E. PAYNE.

REFERENCES CITED

The following references are of record in the file of this patent:

UNITED STATES PATENTS

| Number | Name | Date |
| --- | --- | --- |
| 2,203,525 | Dupree | June 4, 1940 |
| 2,347,118 | Matter | Apr. 18, 1944 |
| 2,365,351 | Matter | Dec. 19, 1944 |
| 2,463,695 | Jensen | Mar. 8, 1949 |